United States Patent
Akiyama et al.

(10) Patent No.: US 12,469,649 B2
(45) Date of Patent: Nov. 11, 2025

(54) CAPACITOR ELECTRODE AND MANUFACTURING METHOD FOR CAPACITOR ELECTRODE

(71) Applicants: Kabushiki Kaisha F.C.C., Hamamatsu (JP); NAGOYA INSTITUTE OF TECHNOLOGY, Nagoya (JP)

(72) Inventors: Tatsuya Akiyama, Hamamatsu (JP); Masaki Tanemura, Nagoya (JP); Shinji Kawasaki, Nagoya (JP); Yosuke Ishii, Nagoya (JP)

(73) Assignees: Kabushiki Kaisha F.C.C., Hamamatsu (JP); NAGOYA INSTITUTE OF TECHNOLOGY, Nagoya (JP)

( * ) Notice: Subject to any disclaimer, the term of this patent is extended or adjusted under 35 U.S.C. 154(b) by 115 days.

(21) Appl. No.: 18/492,993

(22) Filed: Oct. 24, 2023

(65) Prior Publication Data
US 2024/0055193 A1     Feb. 15, 2024

Related U.S. Application Data

(63) Continuation of application No. PCT/JP2022/024855, filed on Jun. 22, 2022.

(30) Foreign Application Priority Data

Jun. 25, 2021   (JP) .................. 2021-106144

(51) Int. Cl.
*H01G 11/38*   (2013.01)
*H01G 11/26*   (2013.01)
*H01G 11/86*   (2013.01)

(52) U.S. Cl.
CPC ........... *H01G 11/38* (2013.01); *H01G 11/26* (2013.01); *H01G 11/86* (2013.01)

(58) Field of Classification Search
None
See application file for complete search history.

(56) References Cited

U.S. PATENT DOCUMENTS

| 8,814,956 B2 * | 8/2014 | Yamazaki | ............ H01M 4/626 |
| | | | 429/218.1 |
| 2013/0017443 A1 * | 1/2013 | Yamazaki | ........... H01M 4/0421 |
| | | | 429/211 |

(Continued)

FOREIGN PATENT DOCUMENTS

| CN | 108336293 A | 7/2018 |
| FR | 2981509 A1 * | 4/2013 ............ H01G 11/28 |

(Continued)

OTHER PUBLICATIONS

FR '509 Translation (Year: 2013).*

(Continued)

*Primary Examiner* — Dion R. Ferguson
(74) *Attorney, Agent, or Firm* — Harness, Dickey & Pierce, P.L.C.

(57) ABSTRACT

A capacitor electrode and manufacturing method capable of not only storing electric charge but also being charged by a chemical reaction of an active material to improve energy density by increasing a storage capacity and firmly holding a sufficient amount of active material while eliminating the necessity of adhesive. A capacitor electrode capable of storing electric charge on its surface to be charged as a result of application of voltage has a substrate (4) made of an electrically conductive metal. Also, it has a carbon film (5), made up of a coating of carbon material, formed on a surface of the substrate (4). Additionally, nanoparticles (6), made of a metal or an oxide of the metal, are included in the carbon film (5).

9 Claims, 5 Drawing Sheets (56) References Cited

U.S. PATENT DOCUMENTS

| | | | | |
|---|---|---|---|---|
| 2014/0329070 A1* | 11/2014 | Draxler | ............... | C23C 14/505 |
| | | | | 204/192.15 |
| 2020/0274168 A1* | 8/2020 | Lavaud | ................. | H01M 4/86 |
| 2024/0055193 A1* | 2/2024 | Akiyama | .............. | H01G 11/26 |

FOREIGN PATENT DOCUMENTS

| | | | |
|---|---|---|---|
| JP | 2010-245068 A | 10/2010 | |
| JP | 2013-502070 A | 1/2013 | |
| JP | 2013-038073 A | 2/2013 | |
| JP | 2020-170700 A | 10/2020 | |
| KR | 10-2005-0009582 A | 1/2005 | |
| WO | WO-2012115050 A1 * | 8/2012 | ............ H01G 11/06 |
| WO | WO-2021/187019 A1 | 9/2021 | |

OTHER PUBLICATIONS

WO '050 Translation (Year: 2012).*
International Search Report dated Sep. 13, 2022 in corresponding PCT Application No. PCT/JP2022/024855.
Japanese Final Decision of Rejection dated Dec. 7, 2023 in corresponding Japanese Application No. 2021-106144.

* cited by examiner

CAPACITOR ELECTRODE AND MANUFACTURING METHOD FOR CAPACITOR ELECTRODE

CROSS-REFERENCE TO RELATED APPLICATIONS

This application is a continuation of International Application No. PCT/JP2022/024855, filed Jun. 22, 2022, which claims priority to Japanese Application No. 2021-106144, filed Jun. 25, 2021. The disclosures of the above applications are incorporating herein by reference.

FIELD

The present disclosure relates to a capacitor electrode capable of storing electric charge on its to be charged surface and a manufacturing method.

BACKGROUND

An electric double layer capacitor that is one of electrical storage devices is capable of storing electric charge on the surfaces of electrodes to be charged and does not accompany a chemical reaction. For this reason, the electric double layer capacitor has characteristics of rapid charge, long cycle life, and a low risk of ignition, and is expected for use in automobiles, mobile terminals, and the like. However, such an electric double layer capacitor has a low energy density and a small storage capacity as compared to batteries, a pseudo-capacitor or a hybrid capacitor is suggested so far.

Existing pseudo-capacitors include a pseudo-capacitor where a pseudo-capacitance metal oxide is deposited on a carbon network capable of storing electric charge on its surface as described in, for example, JP2013-502070 A. With the existing pseudo-capacitors, the pseudo-capacitor is capable of storing electric charge on the surface of the carbon network to be charged and can be charged by causing chemical reaction using a pseudo-capacitance metal oxide adhered to its upper surface as an active material, so it is possible to increase the storage capacity.

SUMMARY

However, in the existing technology, an area where a pseudo-capacitance metal oxide (a layer of active material) is deposited depends on the surface area of the carbon network. Thus, there are limitations on the area where the pseudo-capacitance metal oxide is deposited. Also, there is a possibility that the pseudo-capacitance metal oxide peels off from the surface of the carbon network. In the existing technology, when the pseudo-capacitance metal oxide is deposited on the surface of the carbon network. with adhesive, there is a problem that the electrical resistance at the time of transmission of electric power increases due to the adhesive.

The present disclosure is contemplated in view of such a situation. It provides a capacitor electrode capable of not only storing electric charge but also being charged by chemical reaction of the active material. This improves energy density by increasing the storage capacity and firmly holding a sufficient amount of active material while eliminating the necessity of adhesive. Also, a manufacturing method is disclosed.

A capacitor electrode is capable of storing electric charge on its surface and to be charged as a result of the application of voltage. The capacitor electrode includes a substrate made of an electrically conductive metal, a carbon film made up of a coating of carbon material and formed on a surface of the substrate. Nanoparticles made of a metal or an oxide of the metal are included in the carbon film.

In the capacitor electrode, the nanoparticles are included in the carbon film so as to be distributed three-dimensionally.

In the capacitor electrode, the carbon film has a crystalline structure or an amorphous structure.

In the capacitor electrode, the nanoparticles are made of a metal selected from the group consisting of Ru, Ni, Ti, Mn, Nb, W, Mo, Ir, Ta, V, Sn, Li, and Fe, or an oxide of the metal.

In the capacitor electrode, the nanoparticles are particles with a diameter of less than or equal to 100 nm.

In the capacitor electrode, the capacitor electrode is applied to an electric double layer capacitor where an electric double layer is formed on a surface of the carbon film. A pseudo-capacitor is in addition to the electric double layer. The nanoparticles are chemically reacted as an active material. Also, a hybrid capacitor including a positive electrode where only an electric double layer is formed and a negative electrode where, in addition to the electric double layer, the nanoparticles are chemically reacted as an active material may be formed.

A manufacturing method is disclosed for a capacitor electrode capable of storing electric charge on its surface as a result of an application of voltage. The manufacturing method includes forming a carbon film by forming a carbon material in a film shape on a surface of a substrate made of an electrically conductive metal. The film includes nanoparticles made of a metal or an oxide of the metal.

In the manufacturing method for a capacitor electrode, the carbon film is formed by a dry method, such as a physical deposition method, or a surfacing method.

In the manufacturing method for a capacitor electrode, conical asperities are formed on the surface of the substrate, to be raised by applying energy particles to the substrate or after the surface of the substrate is raised, and carbon and a metal are supplied to form the carbon film including the nanoparticles on the raised surface of the substrate.

In the manufacturing method for a capacitor electrode, it comprises raising for forming conical asperities on the surface of the substrate by applying the energy particles, nanoparticle formation for forming nanoparticles from a target, and deposition for forming the carbon film including the nanoparticles on the surface of the substrate are performed at the same time.

The carbon film is made up of a coating of carbon material formed on the surface of the substrate and the nanoparticles made of a metal or an oxide of the metal included in the carbon film. Thus, it is possible to not only store electric charge on the surface of the carbon film but also for it to be charged by chemical reaction of the nanoparticles serving as an active material. As a result, it is possible to improve an energy density by increasing an electrical storage capacity and to firmly hold the nanoparticles serving as a large amount of active material while eliminating the necessity of adhesive.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Hereinafter, an embodiment of the present disclosure will be specifically described with reference to the drawings.

Figure 1:
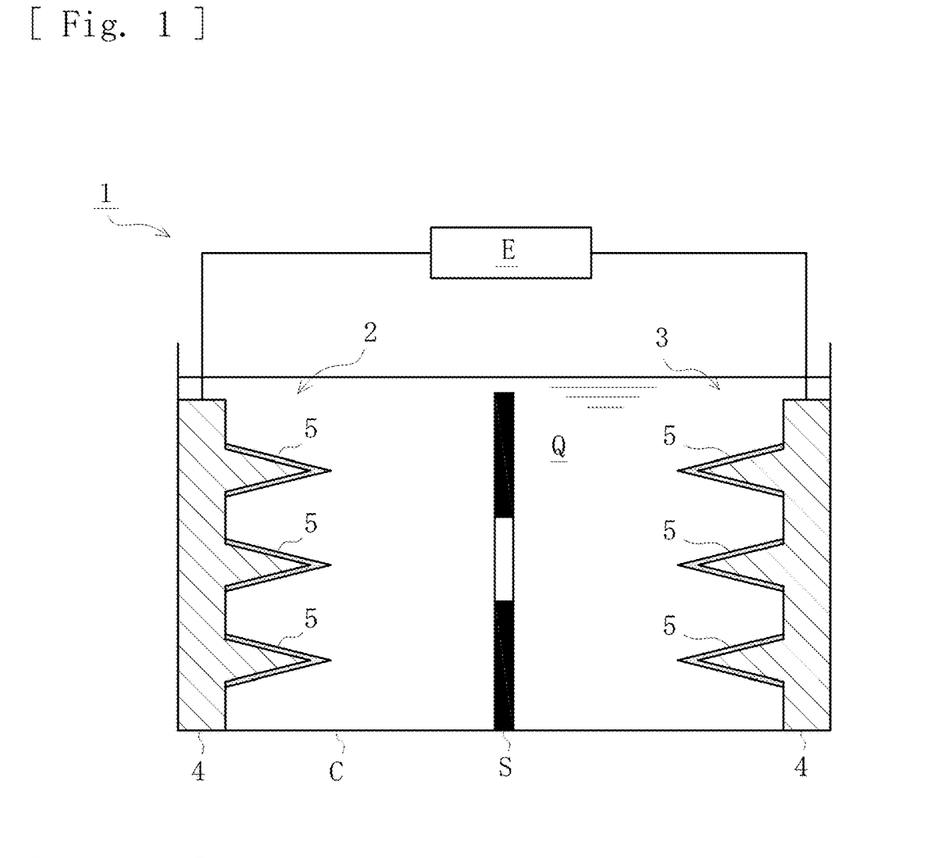
FIG. 1 is a schematic cross-section view of a capacitor with a capacitor electrode.

A capacitor electrode according to the present embodiment is an electrode capable of storing electric charge on its surface to be charged as a result of application of voltage and is applied to a positive electrode 2 and a negative electrode 3 of a capacitor 1 as shown in FIG. 1. The capacitor 1 includes the positive electrode 2, the negative electrode 3, a case C that contains an electrolyte Q, a separator S that partitions the inside of the case C into a positive electrode side and a negative electrode side, and a power supply E connected to the positive electrode 2 and the negative electrode 3.

Figure 2:
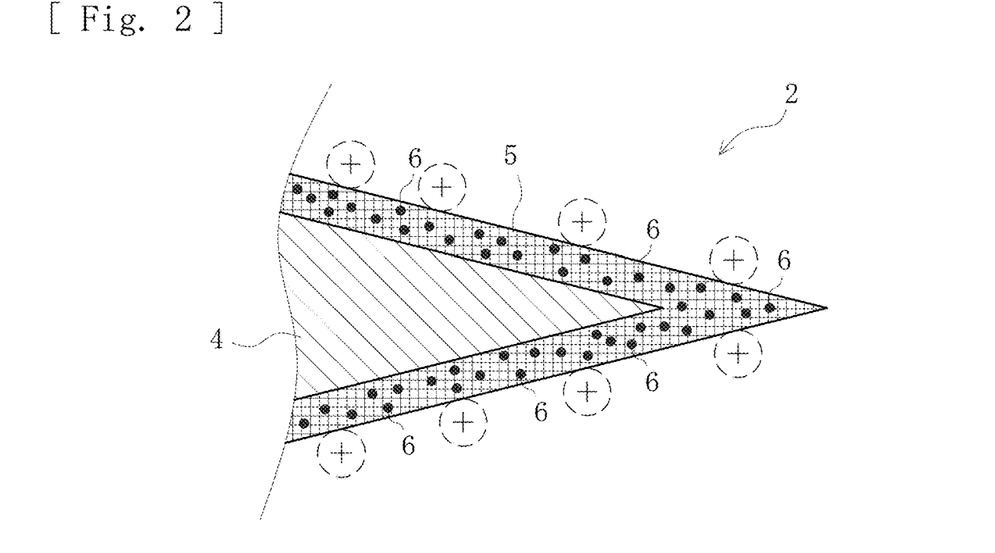
FIG. 2 is an enlarged cross-section view of the negative capacitor electrode.

As shown in FIGS. 1 and 2, the positive electrode 2 includes the substrate 4 made of an electrically conductive metal (Au (gold) in the present embodiment), the carbon film 5, and the nanoparticles 6. It is electrically connected to the power supply E. When a voltage is applied from the power supply E, positive electric charge is adsorbed into the surface of the carbon film 5 from among ions in the electrolyte Q to form an electric double layer, with the result that the positive electrode 2 is charged (store electricity).

Figure 3:
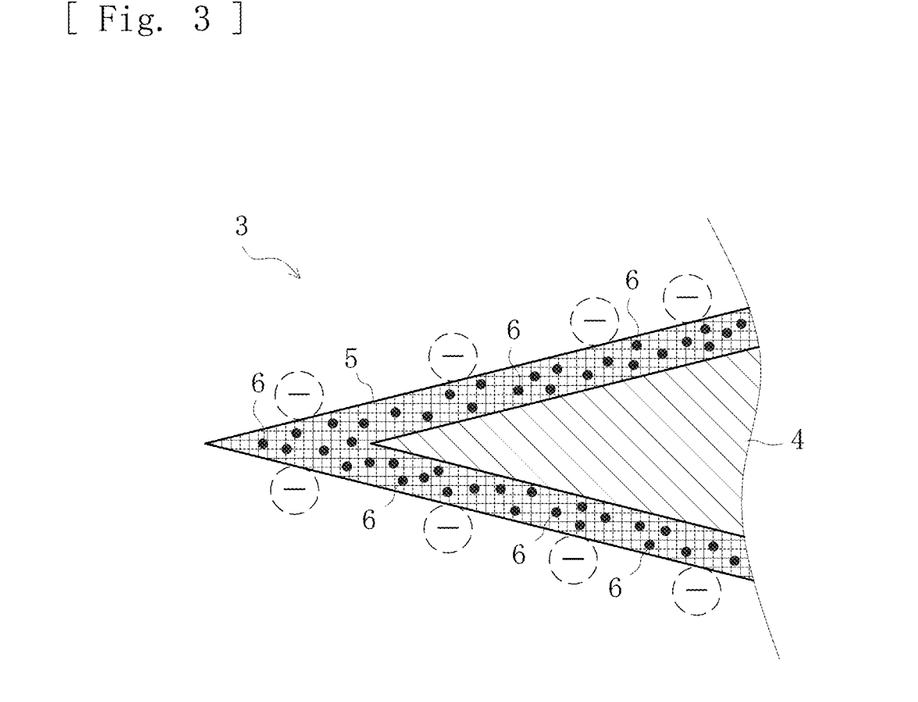
FIG. 3 is an enlarged diagram showing the positive capacitor electrode.

As shown in FIGS. 1 and 3, the negative electrode 3 includes the substrate 4 made of an electrically conductive metal (Au (gold) in the present embodiment), the carbon film 5, and the nanoparticles 6. It is electrically connected to the power supply E. When a voltage is applied from the power supply E, negative electric charge is adsorbed into the surface of the carbon film 5 from among ions in the electrolyte Q to form an electric double layer, with the result that the negative electrode 3 is charged (store electricity).

The carbon film 5 is made up of a coating film of carbon material (C) formed on the surface of the substrate 4. In the present embodiment, the carbon film 5 is made of amorphous carbon including all the allotropes having a molecular defect structure and an irregular structure. The carbon film 5 may be made of a carbon material having a crystalline structure instead of amorphous carbon or may be made of a carbon material having an amorphous structure that is any one of a molecular defect structure and an irregular structure.

The nanoparticles 6 are made of a metal or an oxide of the metal, included (contained) in the carbon film 5, and are included in the carbon film 5 so as to be three-dimensionally distributed as shown in FIGS. 2 and 3. The nanoparticles 6 are preferably particles with a diameter of less than or equal to 100 nm and may be made of, for example, a metal selected from the group consisting of Ru, Ni, Ti, Mn, Nb, W, Mo, Ir, Ta, V, Sn, Li, and Fe, or an oxide of the metal.

The nanoparticles 6 according to the present embodiment function as an active material and are capable of storing electricity by means of a chemical reaction (an electron exchange reaction and an active material internal diffusion reaction between ions in the electrolyte Q and the active material). In other words, with the capacitor electrode (the positive electrode 2 and the negative electrode 3) according to the present embodiment, an electrostatic reaction to form an electric double layer is performed by the carbon film 5, and a chemical reaction (an electron exchange reaction and an active material internal diffusion reaction occur between the active material and ions in the electrolyte Q) occurs due to the nanoparticles 6 in the carbon film 5. Thus, it is possible to increase an electrical storage capacity.

Next, a manufacturing method for a capacitor electrode according to the present embodiment will be described.

Figure 8:
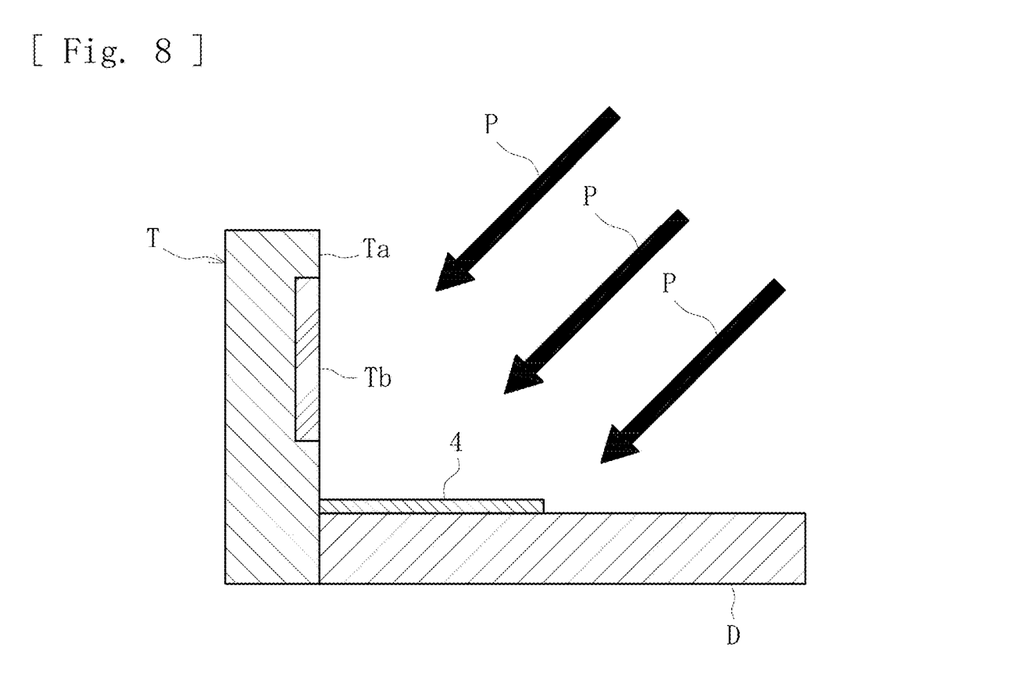
FIG. 8 is a schematic cross-section view of a manufacturing apparatus for manufacturing the capacitor electrode.

Initially, as shown in FIG. 8, the substrate 4 made of gold (Au) is mounted on a placement table D, and a target T is attached to the adjacent position. The target T is formed such that a material plate Tb made of the material of the nanoparticles 6 is formed at a predetermined position of a carbon material plate Ta made of carbon material (C), and, in the present embodiment, the material plate Tb is made of nickel (Ni).

Then, energy particles P (for example, argon ions) are applied at an angle of 45 degrees to the surface of the placement table D. A knock-on phenomenon of a surface constituent element, referred to as sputtering, occurs by ion irradiation, and the surface of the substrate 4 and the target T are sputtered. In the sputtering, energy particles P are applied at an incident angle of 45 degrees to a predetermined range of the target T including the carbon material plate Ta and the material plate Tb and the surface of the substrate 4. Thus, the surface of the substrate 4 is processed to form asperities, and, at the same time, carbon particles from the carbon material plate Ta and the nanoparticles 6 from the material plate Tb are laminated on the substrate 4. Accordingly, it is possible to form the carbon film 5 with the nanoparticles 6 on the surface of the substrate 4. The present disclosure is not limited to the one manufactured with the apparatus shown in FIG. 8 and may be supplied with carbon and a metal (oxide) at the same time from a deposition apparatus, such as a vacuum vapor deposition source and an arc plasma deposition source, during sputtering or after sputtering.

Figure 5:
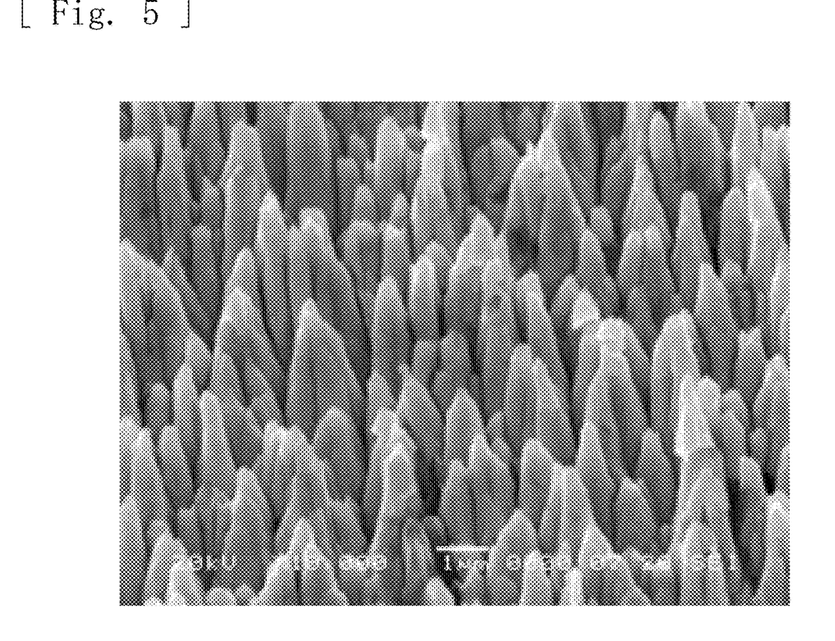
FIG. 5 is a microscope photo of the surface of the capacitor electrode.
Figure 6:
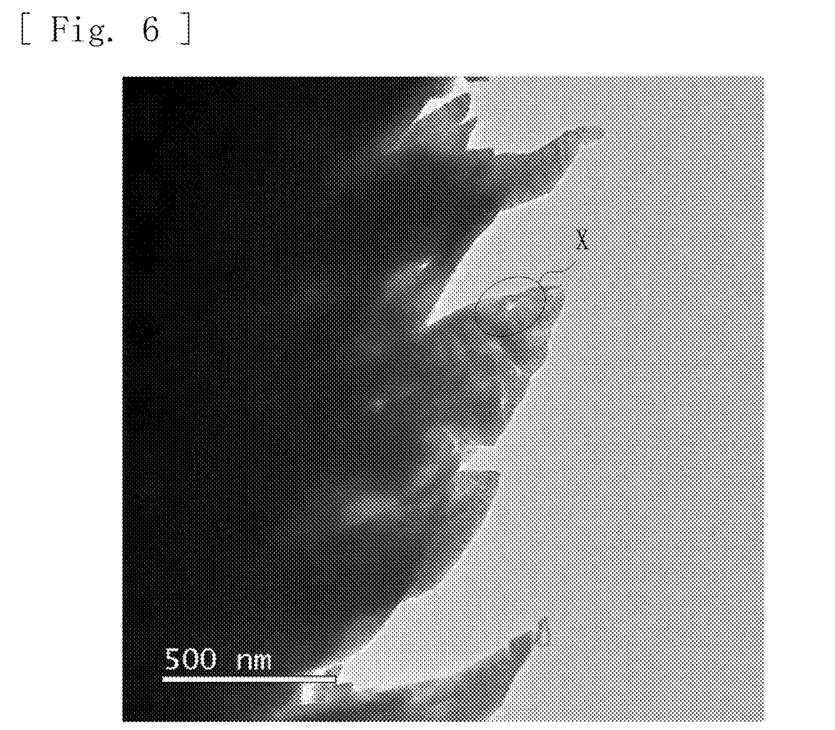
FIG. 6 is a microscope photo of a predetermined area of the surface of the capacitor electrode.
Figure 7:
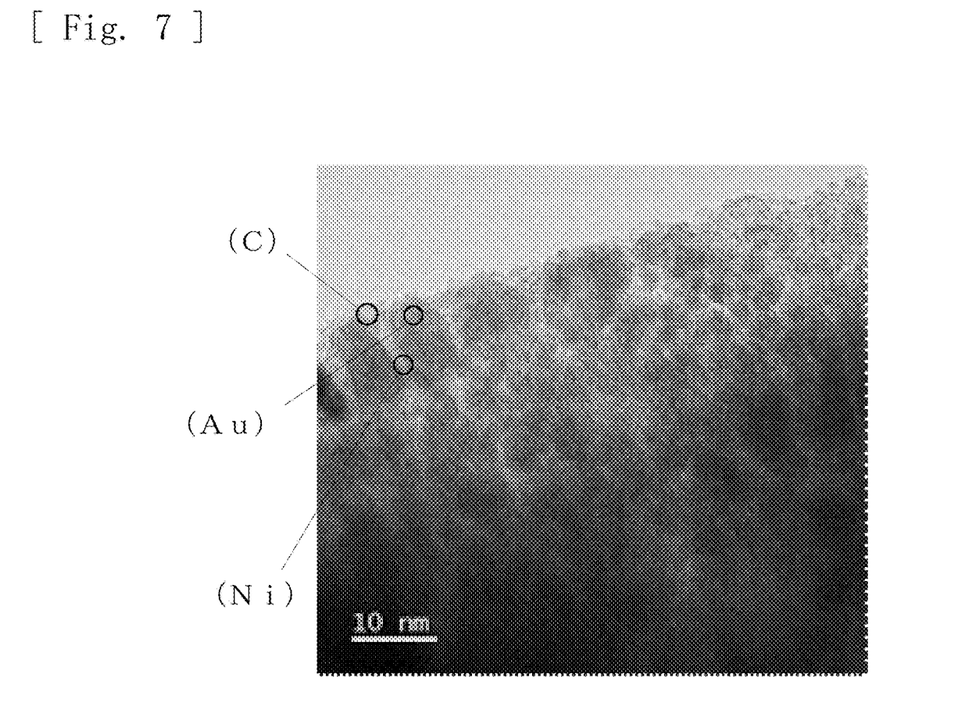
FIG. 7 is a microscope photo of a portion X in FIG. 6 in a magnified view.

When the surface of the substrate 4 after sputtering was observed with a scanning electron microscope, conical asperities were densely formed and the length of each cone was about less than or equal to 5 μm, as shown in FIG. 5. When a specific cone was observed, the presence of the carbon material (C) that was a component of the carbon film 5, gold (Au) that was a component of the substrate 4, and nickel (Ni) with a diameter of about 2 nm, which was a component of the nanoparticles 6 was identified by measuring interatomic distances, as shown in FIG. 7 for the area indicated by the sign X in FIG. 6. The nanoparticles 6 may be particles of another metal or an oxide of the metal as long as the particles have a diameter less than or equal to 100 nm (preferably, about 1 nm to about 10 nm).

Therefore, it is found that the carbon material (C) including nickel (Ni), as the nanoparticles 6, is deposited on the raised surface of the substrate 4 by sputtering. In this way, in the present embodiment, it is possible to perform raising to form conical asperities on the surface of the substrate 4, nanoparticle formation forms the nanoparticles 6 from the target T, and deposition forms the carbon film 5 including the nanoparticles 6 on the surface of the substrate 4 by sputtering at the same time.

Figure 4:
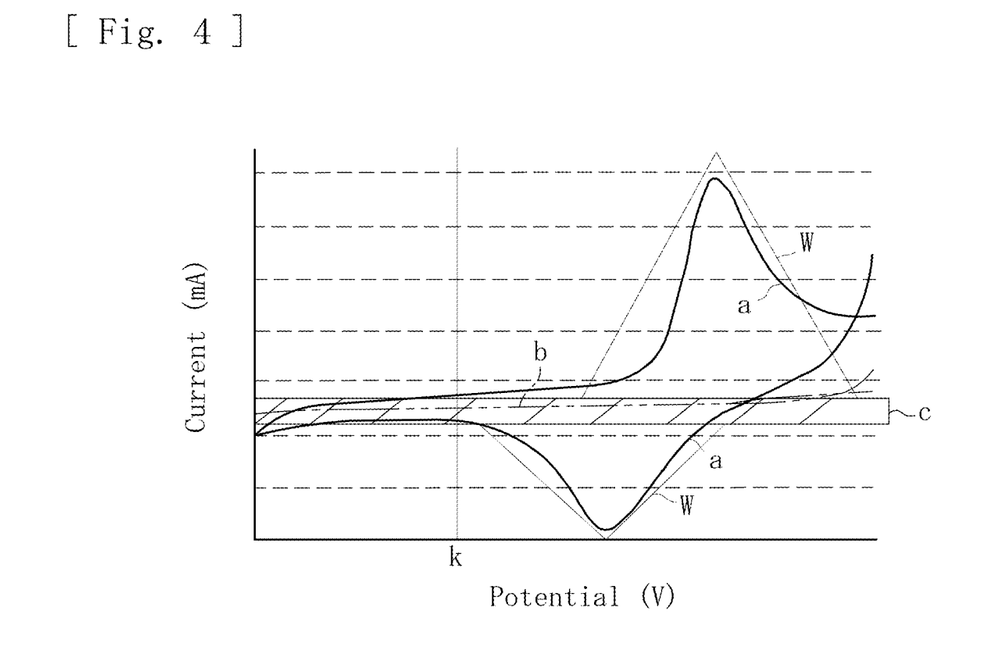
FIG. 4 is a graph of results measured by cyclic voltammetry on the capacitor electrode.

The manufactured capacitor electrode was applied to the capacitor 1 as each of the positive electrode 2 and the negative electrode 3 (see FIG. 1), and evaluation of characteristics was performed by measuring voltage and current with cyclic voltammetry. Then, the results as shown in FIG. 4 were obtained. In the graph, the one that the nanoparticles 6 (nickel) are not included in the carbon film 5 is measured as a comparative example. The characteristics are represented as graph b. The characteristics of an example where the nanoparticles 6 are included in the carbon film 5 are represented as graph a. Electrostatic capacitance (electric double layer capacity) is represented as graph c.

As is apparent from the graphs, in both the example and the comparative example, there is a characteristic region of an electric double layer capacitor. In the example, an electrostatic capacity of an electric double layer capacitor is improved as compared to the comparative example. This is presumably due to a surface area effect provided by the nanoparticles 6 smaller than or equal to 100 nm (in the present embodiment, 1 nm to 2 nm).

For example, a typical peak (a portion of chemical capacitance indicated by the sign W in FIG. 4) caused by a chemical reaction (faradaic reaction) at or after k V (about 0.35 V for the one where nickel is used as the nanoparticles 6 as in the case of the present embodiment) appears. Thus, it is found that storage of electricity caused by a chemical reaction (an electron exchange reaction and an active material internal diffusion reaction between the electrolyte Q and the active material) is performed. Therefore, with the capacitor electrode according to the present embodiment, when a voltage lower than or equal to a specific value k V is applied from the power supply E, the capacitor electrode can be applied to an electric double layer capacitor where an electric double layer is formed on the surface of the carbon film 5; whereas, when a voltage higher than or equal to the specific value k V is applied from the power supply E, the capacitor electrode can be applied to a pseudo-capacitor where not only an electric double layer but also the nanoparticles 6 serving as an active material are chemically reacted.

Figure 9:
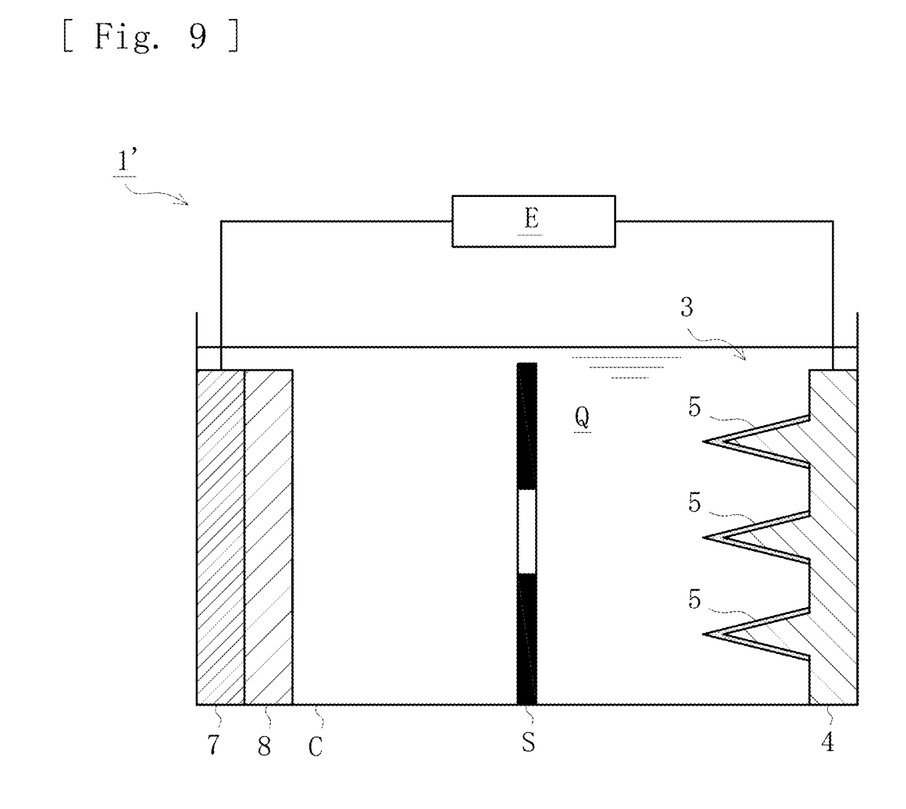
FIG. 9 is a schematic cross-section view of a state where the capacitor electrode is applied to a hybrid capacitor.

Furthermore, as shown in FIG. 9, when, for example, a positive electrode 8, made of activated carbon, is used instead of the positive electrode 2, the capacitor electrode can be applied to a hybrid capacitor 1'. The hybrid capacitor 1' includes the positive electrode 8 where only the electric double layer is formed and the negative electrode 3 where not only the electric double layer but also the nanoparticles 6 serving as an active material are chemically reacted. The positive electrode 8 is connected to the power supply E via a positive collecting electrode 7.

In the present embodiment, when sputtering is performed by applying energy particles P to the target T including carbon and the material of nanoparticles, the carbon film 5, including the nanoparticles 6. is formed on the surface of the substrate 4. Any manufacturing method is applicable as long as the carbon film 5 is formed by a dry method, such as a physical deposition method, or a surfacing method. In other words, the manufacturing method for a capacitor electrode according to the present embodiment may be any method as long as a carbon material is formed in a film shape on the surface of the substrate 4 made of an electrically conductive metal to form the carbon film 5 and the nanoparticles 6 made of a metal or an oxide of the metal are included in the carbon film 5.

According to the present embodiment, the carbon film 5 is made up of a coating of carbon material formed on the surface of the substrate 4 and the nanoparticles 6 made of a metal or an oxide of the metal and included in the carbon film 5. Thus, it is possible to not only store electric charge on the surface of the carbon film 5 but also be charged (surface electric charge) by chemical reaction of the nanoparticles 6 serving as an active material. As a result, it is possible to improve an energy density by increasing an electrical storage capacity and to firmly hold the nanoparticles 6 as a large amount of active material while eliminating the necessity of adhesive.

Particularly, the nanoparticles 6 according to the present embodiment are included in the carbon film 5 so as to be three-dimensionally distributed. Thus, it is possible to hold a large amount of nanoparticles 6 distributed in the carbon film 5 and to further increase the electrical storage capacity. When the carbon film 5 made of a carbon material having an amorphous structure is used, it is possible to further sufficiently and favorably perform chemical reaction using the nanoparticles 6 as an active material.

Furthermore, it is possible to perform raising to form conical asperities on the surface of the substrate 4, nanoparticle formation to form the nanoparticles 6 from the target T, and deposition to form the carbon film 5 including the nanoparticles 6 on the surface of the substrate 4 by sputtering at the same time. Thus, it is possible to reduce manufacturing cost and to provide a low-cost capacitor electrode. Furthermore, since the nanoparticles 6 are particles with a diameter of less than or equal to 100 nm, it is possible to reliably embed the nanoparticles 6 in the carbon film 5, and it is possible to favorably include the nanoparticles 6.

The present embodiment has been described above; however, the present disclosure is not limited. For example, the substrate 4 may be made of an electrically conductive metal of another material, and the nanoparticles 6 may be particles made of another metal or an oxide of the metal capable of storing chemical energy. The energy particles P to be applied are not limited to ions, such as argon ions, and may be an electron beam, laser, neutral particles, or the like.

A capacitor electrode includes a substrate made of an electrically conductive metal, a carbon film made up of a coating of carbon material formed on a surface of the substrate, and nanoparticles made of a metal or an oxide of the metal and are included in the carbon film. Also, a manufacturing method exist. The capacitor electrode and the manufacturing method are applicable to those with a different external shape, those added with another function, or the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A capacitor electrode capable of storing electric charge on its to be charged surface as a result of application of voltage, the capacitor electrode comprising:

a substrate made of an electrically conductive metal;

a carbon film made up of a coating of carbon material and formed on a surface of the substrate; and nanoparticles made of a metal or an oxide of the metal and included in the carbon film, wherein the nanoparticles have a diameter of about 1 nanometers (nm) to about 10 nm.

2. The capacitor electrode according to claim 1, wherein the nanoparticles are included in the carbon film so as to be distributed three-dimensionally.

3. The capacitor electrode according to claim 1, wherein the carbon film has a crystalline structure or an amorphous structure.

4. The capacitor electrode according to claim 1, wherein the nanoparticles are made of a metal selected from the group consisting of Ru, Ni, Ti, Mn, Nb, W, Mo, Ir, Ta, V, Sn, Li, and Fe, or combination thereof or an oxide of the metal.

5. The capacitor electrode according to claim 1, wherein the capacitor electrode is applied to an electric double layer capacitor where an electric double layer is formed on a surface of the carbon film, a pseudo-capacitor where, in addition to the electric double layer, the nanoparticles are chemically reacted as an active material, or a hybrid capacitor including a positive electrode where only an electric double layer is formed and a negative electrode where, in addition to the electric double layer, the nanoparticles are chemically reacted as an active material.

6. A manufacturing method for a capacitor electrode capable of storing electric charge on its surface to be charged as a result of application of voltage, the manufacturing method comprising:

forming a carbon film by forming a carbon material in a film shape on a surface of a substrate made of an electrically conductive metal and including nanoparticles made of a metal or an oxide of the metal in the carbon film, wherein the nanoparticles have a diameter of about 1 nanometers (nm) to about 10 nm.

7. The manufacturing method for a capacitor electrode according to claim 6, wherein the carbon film is formed by a dry method, such as a physical deposition method, or a surfacing method.

8. The manufacturing method for a capacitor electrode according to claim 7, wherein, as conical asperities are formed on the surface of the substrate to be raised by applying energy particles to the substrate or after the surface of the substrate is raised, carbon and a metal are supplied to form the carbon film including the nanoparticles on the raised surface of the substrate.

9. The manufacturing method for a capacitor electrode according to claim 8, wherein raising for forming conical asperities on the surface of the substrate by applying the energy particles, nanoparticle formation for forming nanoparticles from a target, and deposition for forming the carbon film including the nanoparticles on the surface of the substrate are performed at the same time.

* * * * *